United States Patent [19]
Skriletz et al.

[11] 3,993,727
[45] Nov. 23, 1976

[54] FLUID-RELEASE MOLD AND THE METHOD OF MANUFACTURING THE SAME

[75] Inventors: Rudolph A. Skriletz, Marysville; Virgil D. Kendall, Springfield, both of Ohio

[73] Assignee: Wallace-Murray Corporation, New York, N.Y.

[22] Filed: Dec. 3, 1975

[21] Appl. No.: 637,236

Related U.S. Application Data

[63] Continuation of Ser. No. 533,960, Dec. 18, 1974, abandoned, which is a continuation of Ser. No. 346,291, March 30, 1973, abandoned.

[52] U.S. Cl. .............................. 264/225; 29/200 R; 264/87; 156/305; 156/309; 156/330; 425/175; 425/420; 425/437; 425/DIG. 102; 425/DIG. 119

[51] Int. Cl.$^2$ .......................................... B29C 1/02

[58] Field of Search ............ 425/420, 84, 425, 437, 425/DIG. 102, DIG. 119, DIG. 30, 176, 175; 264/87, 225; 249/113, 134, 66 A, 141, 79, 80, 81; 106/41; 29/200 R; 156/60, 305, 309, 330

[56] References Cited

UNITED STATES PATENTS

| | | | |
|---|---|---|---|
| 2,584,109 | 2/1952 | Blackburn et al. | 249/134 X |
| 2,615,229 | 10/1952 | Blackburn et al. | 425/437 X |
| 2,619,702 | 12/1952 | Blackburn et al. | 249/66 |
| 3,005,491 | 10/1961 | Wells | 249/113 |
| 3,286,974 | 11/1966 | Dean et al. | 249/66 X |
| 3,384,499 | 5/1968 | Blackburn et al. | 106/41 X |
| 3,641,229 | 2/1972 | Lawrence et al. | 264/43 |
| 3,723,584 | 3/1973 | Nussbaum | 249/80 X |
| 3,784,152 | 1/1974 | Garner et al. | 249/80 |

*Primary Examiner*—Robert L. Spicer, Jr.
*Attorney, Agent, or Firm*—Schuyler, Birch, Swindler

[57] ABSTRACT

A fluid-releasable mold for forming shaped ware including a porous mold body comprising at least 70% alumina, up to 15% ball clay and up to 15% talc is disclosed. A mold face is formed on one surface of the mold body and fluid-permeable conduit is provided in communication with a second surface of the mold body with means for sealing the fluid-permeable conduit to the second mold body surface to prevent the escape of fluid from the conduit other than through the mold body and out the mold face. The arrangement obviates the problem of gradual loss of porosity which has heretofore limited the service life of fluid-release molds of alumina, ball clay, and talc.

28 Claims, 2 Drawing Figures

FIG. 1
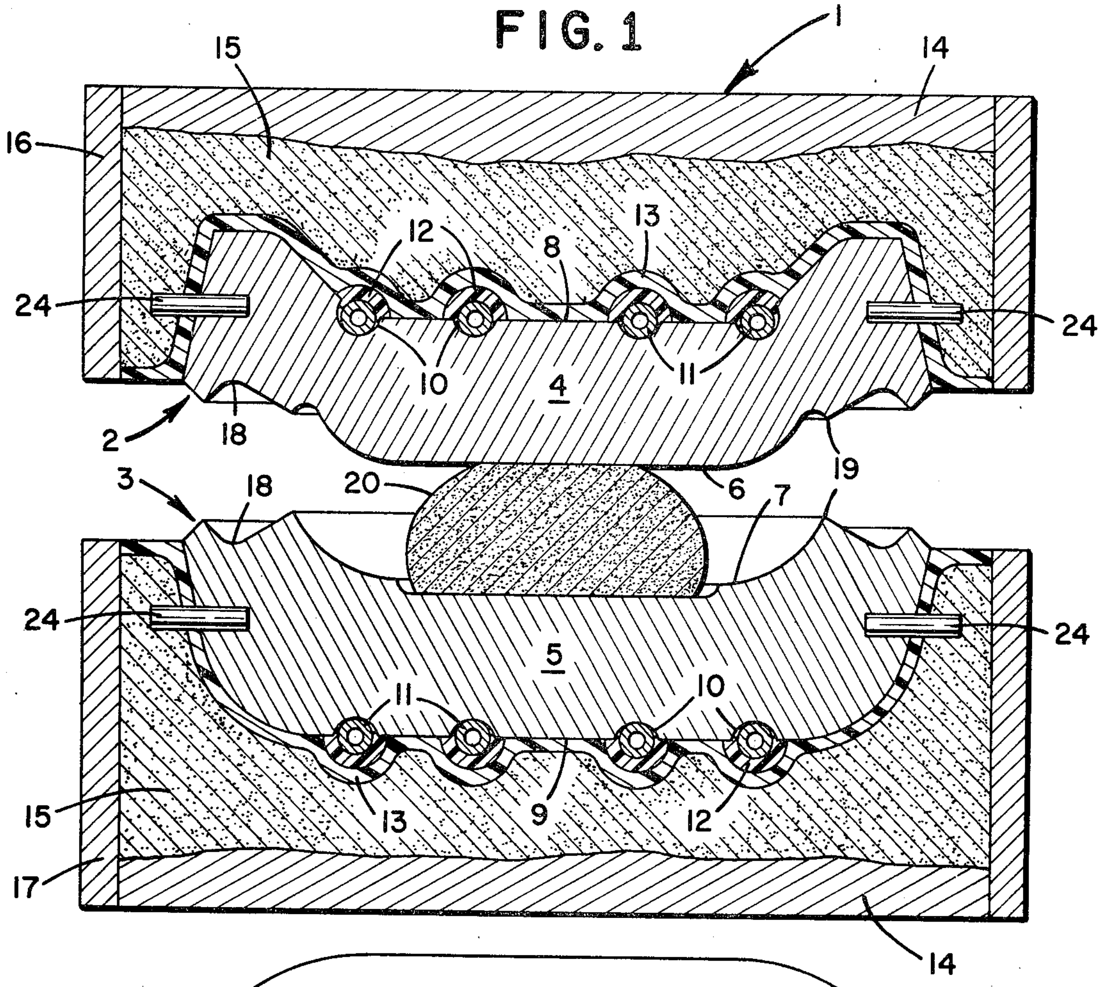
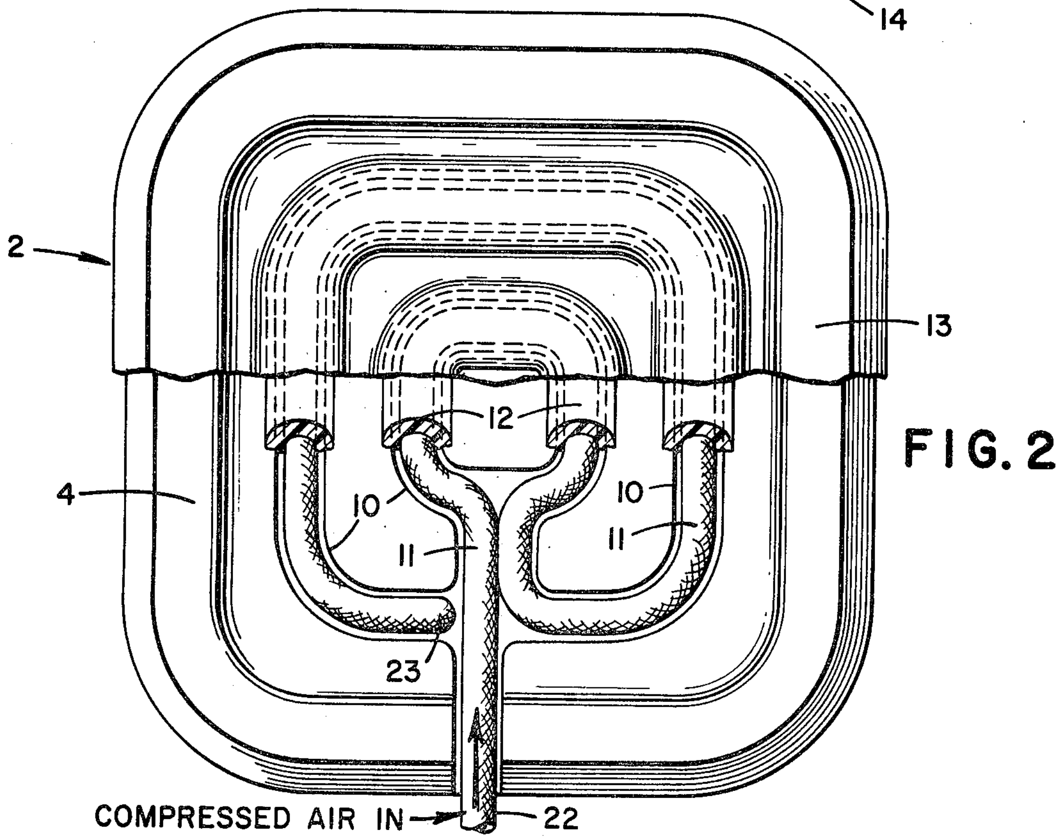
FIG. 2

FLUID-RELEASE MOLD AND THE METHOD OF MANUFACTURING THE SAME

This is a continuation of application Ser. No. 533,960 filed Dec. 18, 1974; which in turn is a continuation of application Ser. No. 346,291, filed Mar. 30, 1973, both now abandoned.

BACKGROUND OF THE INVENTION

The use of air-release press molding has been widely adopted in the ware forming industry. The process involves pressing a quantity of plastic clay between cooperating male and female molds or dies formed of porous, fluid-permeable material. In addition to shaping the ware, the pressing operation also substantially dewaters the clay by forcing excess water into the pores of the molds. Release of the shaped ware, which adheres to the mold faces, is accomplished without distorting or damaging the ware by applying fluid pressure to a conduit embedded in one of the mold bodies so that the fluid passes from the conduit, diffuses throughout the porous mold body and exits through the mold face as a uniform blanket shortly before the male and female die members are separated. The shaped clay ware adheres to the second mold or die which is transferred to a ware depositing station where fluid pressure is applied in a like manner to the second mold member to complete the release of the formed article. This basic process is disclosed in U.S. Pat. Nos. 2,584,109 and 2,584,110.

The original air-release mold bodies were formed of high grade gypsum plaster or gypsum cement which was found to have nearly ideal porosity for proper fluid permeability. Perforated metal tubing or permeable woven tubing was cast in the plaster molds to provide the required fluid conduits. The gypsum materials, however, were of limited hardness and consequently over the course of repeated pressing operations the faces of the molds would gradually wear away until the molds became unusable and had to be replaced. Although the service life of gypsum molds varied depending on the characteristics of the plastic clay being pressed, the configuration of the molds, the applied force and other factors, the practical service life of gypsum molds was generally no more than about 1000 pressing operations. This necessitated relatively frequent replacement of the molds with the attendant disadvantages of expense for replacement molds, loss of production time, and non-uniformity of the produced ware due to slight differences between molds. Consequently, the ware forming industry searched for a substitute material for forming the molds which would have the required porosity characteristics closely approximating those of gypsum plaster and which would have a greater hardness enabling it to resist wear.

A crystalline bonded ceramic comprising at least 70% alumina, up to 15% ball clay and up to 15% talc fired to a point short of the theoretical density for the ceramic has been found to be a virtually ideal material. This material is disclosed in U.S. Pat. No. 3,384,499. The alumina, ball clay and talc composition with or without additives, such as manganese dioxide or carbon black, is formed into a slurry, cast and subsequently fired at a temperature ranging from 2,000° F to 2,350° F. The exact firing conditions are controlled to prevent the ceramic mold body from reaching its theoretical density, i.e. the maximum density that the material would achieve if fired to an essentially solid nonporous state. Control of the firing conditions will be discussed in greater detail hereinafter.

The necessary fluid conduit means were formed in the interior of the mold bodies by casting a combustible tubing in the interior of the alumina, ball clay, and talc mold body which was later consumed during the firing operation to leave an open conduit running through the mold body. It was generally considered necessary to form the fluid conduit in the interior of the mold body in order to provide for maximum transfer of fluid from the conduit to the mold body by utilizing the entire circumference of the conduit.

Porous fluid-release molds and dies formed from the new alumina, ball clay and talc material have vastly superior tensile strength, hardness, and wear resisting properties. Whereas a fluid-release, porous mold of gypsum material had a useful service life of approximately 1000 pressing operations, molds and dies formed of the new material were capable of resisting wear and breakage and had a potential useful service life of literally tens of thousands of pressing operations.

In actual operation it was found, however, that the fluid permeability of molds or dies formed of the new alumina, ball clay and talc material progressively decreased so that after two or three thousand pressing operations, the molds were useless because they would no longer conduct sufficient fluid to effect a smooth release of the ware from the mold faces. After just a few thousand pressing operations, the new molds had to be replaced even though the mold faces were not appreciably worn or broken. The explanation given by the art for this gradual decrease in fluid permeability was that silicates from the plastic clay being formed into ware were carried by the water pressed out of the clay and absorbed in the pores of the mold, and were deposited in the pores, thereby progressively closing off the passageways for the fluid and eventually rendering the mold unusable. It was postulated that such a deposition of silicates had also occurred in the gypsum plaster molds and dies but that the service life of the gypsum molds was so short that the problem of decreased fluid permeability had not arisen.

Extensive research was done attempting to eliminate the clogging problem by attacking the deposition of silicates in the interior pores of the mold body. The composition of the plastic clay being pressed was varied in an attempt to prevent the deposition of silicates. Numerous types of acid and alkaline washes were attempted for the purpose of dissolving and removing deposited silicates. All the efforts of the art were unavailing. Despite strenuous efforts over a period of years to solve the problem, molds and dies formed of the new alumina, ball clay, and talc composition still became unusable after approximately two or three thousand pressings. Since the expense of preparing the new alumina, ball clay and talc molds is substantially greater than the cost of preparing mold bodies of gypsum plaster, the competitive advantage of the new material over gypsum was retarded by the clogging problem.

SUMMARY OF THE INVENTION

It is an object of this invention to provide a porous, fluid release mold comprising at least 70% alumina, up to 15% ball clay and up to 15% talc which is characterized by high tensile strength, hardness and wear resistance and which is not subject to a subject to a permanent decrease in fluid permeability during its service life.

It is a further object of this invention to provide a porous, fluid release mold which has a service life of up to 60,000 or more pressings and which eliminates high production costs arising from the production of large numbers of molds necessary for frequent replacement and from the loss of production time occurring during the replacement of molds.

It has now been found that contrary to the teachings of the art, the decrease in fluid permeability of the alumina, ball clay, and talc molds after two or three thousand pressing operations was not due to the deposition of silicates in the pores. It has been discovered that the decrease in fluid permeability arises from accumulation of residues from the combustible tubing which was burned out during the firing of the alumina, ball clay, and talc mold body in order to form the fluid conduit in the interior of the mold body. It has previously been thought that virtually no residues remained after the consumption of the combustible tubing in the firing operation. The possibility of residues from incomplete combustion of the tubing blocking the pores was dismissed because it was reasoned that the effect of any such residues would be immediate whereas the decrease in fluid permeability arose gradually during the service life of the mold bodies.

It has now been found that contrary to all expectations, a small amount of residue is formed from the consumption of the combustible tubing. Initially, a major portion of this residue remains in the conduit formed by the tube. As fluid pressure is intermittently applied through the conduit to the mold member, this residue is repeatedly brought in contact with the walls of the conduit and gradually works its way into the pores of the mold body. The residue material does not immediately plug the pores, rather it gradually works its way through the system of pores until it lodges. Accordingly, the accumulation of residue material in the pores is gradual and accounts for the gradual decrease in fluid permeability of the mold body up to about 3000 pressings. Once the entirely unexpected cause of the clogging problem was finally recognized, an effective solution could be achieved. The problem of accumulation of residue in the pores of the mold bodies has been solved by casting and firing the alumina, ball clay, and talc mold body without a consumable tube forming a conduit therein. After the mold body has been fired, fluid-permeable conduit means are affixed to the exterior of the mold body at some point other than on the mold face and the non-communicating surfaces of the permeable conduit means and the exterior surface of the mold body except for the mold face are sealed against passage of fluid so that when pressurized fluid is supplied to the fluid conduit means, the fluid is constrained to pass through the portion of the permeable conduit means communicating with the mold body and form thence through the mold body and to exit through the mold face. The size and spacing of the fluid conduit means may be varied in order to regulate the egress of fluid through the mold face.

The objects of the invention are achieved by providing a fluid release mold for forming shaped ware from plastic material comprising a porous mold body comprising at least 70% alumina, up to 15% ball clay and up to 15% talc fired to a point short of the theoretical density for the ceramic and having a mold face formed on first surface thereof; fluid conducting means in communication with a second surface of the porous mold body whereby fluid from the fluid conducting means may be passed into the porous mold body; and means for sealing the non-communicating portions of the fluid conducting means and the second surface of the mold body against passage of fluid whereby fluid from said fluid conducting means must pass into the porous mold body and exit therefrom through the mold face thereby effecting release of the shaped ware from the mold body.

As previously stated the porous mold bodies utilized in the invention are comprised of at least 70% alumina, no more than 15% talc and up to 15% ball clay. Unless otherwise specifically indicated, all percentages are in terms of weight percent. The components of the mold bodies are mixed together with water in a ball mill to form a slurry which is then cast by conventional techniques to form green mold bodies. Best structural strength and production economy are obtained when the mold bodies have a substantially uniform thickness of approximately 1½ inches although the mold bodies may be made either thicker or thinner in appropriate circumstances. The cast green mold bodies are dried and thereafter fired to a point short of their theoretical density. The theoretical density is the density which the material would achieve if fired to an essentially solid, non-porous state. The density of the material and thus the porosity of the fired mold bodies depends not only on the composition, but also on the temperature and time of firing. The following experimental test data illustrates the effect of firing the temperature on the mold bodies.

A series of four test bodies was formed from a composition of alumina, ball clay, and talc according to the invention. The test bodies were dried and then fired to various temperatures in a baffled kiln in which the heating rate was maintained at 87° F per hour. After firing the percent porosity, modulus of rupture and percent shrinkage were determined for each test body. The results are listed in Table I.

TABLE I

EFFECT OF VARIATIONS IN FIRING CONDITIONS

| Firing Temperature (degrees F) | Percent Porosity (by volume) | Modulus of Rupture (p.s.i.) | Period Shrinkage (length) |
|---|---|---|---|
| 2,100 | 39.5 | 7,500 | 1.0 |
| 2,220 | 35.0 | 9,700 | 3.0 |
| 2,340 | 28.0 | 10,900 | 4.5 |
| 2,380 | 23.0 | 11,000 | 7.0 |

The foregoing results show that as the firing temperature is increased, the porosity of the resulting mold body is decreased. The strength of the mold body in terms of its modulus of rupture increases as the firing temperature is increased and the shrinkage of the mold body during firing also increases with an increase in firing temperature. Generally, the effect of time of heating parallels that of temperature. Accordingly, by controlling these factors, it is possible to produce mold bodies having a controlled degree of porosity. Generally the porosity of the mold body should be at least about 25% and preferably about 38%. Increases in porosity are achieved only by sacrificing some of the strength of the body. The minimum required strength of the mold body depends on the parameters of the particular manufacturing operation in which it is to be used. Up to 5% by weight manganese dioxide may be added to the initial components of the mold body as a flux to enhance the strength of the fired body.

A deflocculent optionally may also be added to the casting slip to reduce the thixotropy and thin out the mixture so that the mixture may be cast more easily into the desired mold body configuration. DARVAN No. 7, a 25% polyelectrolyte solution industrial dispersing agent [manufactured by the Polymers and Chemical Division of W. R. Grace and Co., Cambridge, Massachusetts] and distributed by the R. T. Vanderbilt Company, Inc., New York, New York, has been found to be a suitable agent for such purpose. It is also thought that the presence of the polyelectrolyte dispersing agent may help to facilitate release of the green alumina, ball clay and talc mold body from the form in which it is cast. The addition of a trace amount of barium carbonate to digest soluble salts has been found to further enhance the results obtained.

The rate of heating should be carefully controlled to achieve substantially uniform temperature conditions within the kiln in order to minimize checking, cracking and spalling of the fired mold bodies and to achieve the most uniform distribution of porosity throughout the mold bodies possible.

The firing is carried out by placing the dried, cast mold bodies in a kiln and heating the kiln to a maximum temperature lying in the range of from 2200° F to 2350° F. Preferably the temperature of the kiln is raised at a rate of 40° F per hour or less, most preferably approximately 25° F per hour, until the temperature of approximately 2000° F is achieved. Thereafter, the rate of heating is decreased preferably to approximately 12° or 13° F per hour until the maximum temperature is achieved. Most preferably the maximum temperature will be approximately 2250° F. The mold bodies are not "soaked" i.e., heated for a period of time at the maximum temperature; instead, the kiln heat is cut off when the maximum temperature is reached and the kiln is allowed to cool down over a period of approximately 24 to 36 hours. After the kiln has cooled to a temperature of approximately 300° F, it may be opened and the fired mold bodies removed. The dimensional shrinkage during firing is desirably maintained at less than approximately 1% so that the total shrinkage during drying and firing of the mold bodies is less than about 1½%. The reduced heating rate after the temperature in the kiln has reached approximately 2000° F is thought to minimize checking and cracking of the mold bodies.

Example

An alumina, ball clay and talc casting slip was made by slurring 300 pounds calcined alumina (325 mesh size or less), 13½ pounds talc and 18 pounds ball clay approximately 95 pounds of water. 16½ pounds manganese dioxide was added as a strengthening flux. 750 grams Vanderbilt V-gum T was included to serve as a temporary binder; 700 grams DARVAN No. 7 polyelectrolyte was added as a deflocculent, and 75 grams powdered barium carbonate was added as a digesting agent. After a uniform slurry had been obtained, a portion of the slip was cast into a series of test bars. The bars were dried, and two series of test bars were kiln fired. In each series, the firing kilns were heated at a rate of 25° F per hour to a temperature of approximately 2000° F, and the heating rate thereafter was reduced to between 12° to 13° per hour up to a final temperature of approximately 2250° F at which point the deformation of the pyrometric cones used to monitor the firing indicated completion of the firing. The kiln heat was then cut off and the kiln was allowed to cool gradually over a period of 24 hours. After the kiln had cooled to substantially ambient temperature the test bars were removed and the porosity and strength in terms of modulus of rupture were determined for each bar. Sample bars checked for shrinkage were all within the 1½% limit. The results of the tests are summarized in Table II below.

TABLE II

| Test Series & Bar No. | Modulus of Rupture (p.s.i.) | Porosity (% volume) |
|---|---|---|
| I-1 | 8150 | 39.8 |
| I-2 | 3590 | 41.0 |
| I-3 | 5380 | 40.3 |
| I-4 | 5220 | 39.5 |
| I-5 | 8450 | 41.6 |
| I-6 | 4000 | 41.3 |
| Series Average | 5800 | 40.6 |
| II-1 | 6280 | 42.2 |
| II-2 | 5900 | 41.5 |
| II-3 | 2100* | 39.5 |
| II-4 | 4800 | 40.6 |
| II-5 | 8320 | 41.4 |
| II-6 | 4280 | 41.2 |
| Series Average | 5920 | 41.1 |
| Overall Average | 5850 | 40.8 |

*Low strength due to flaw in casting; excluded from calculation of averages.

As can be seen from the table, the sample composition consistently provided test bodies with acceptable porosity and strength characteristics.

After the completed molds are fired, a fluid permeable conduit is affixed to one of the sides of each of the mold bodies. Normally the mold body is comparatively thin and the fluid conduit means will be affixed to the side opposite the mold face; however, it may be practical to affix the conduit to the mold body adjacent the mold face. The fluid-permeable conduit may comprise a perforated metal tube, a rigid metal mesh conduit or a tube formed of woven fabric material such as cotton or nylon. Asbestos fibers might also be used for high temperature applications. Woven fabric is preferred because of its low cost and the ease of handling such lightweight flexible materials. Perforated thermosetting plastic tubing or a thermosetting plastic mesh might be utilized.

The fluid conducting means could also take the form of an elongated conduit having a U-shaped cross section with the open end of the U mounted against the surface of the porous mold body.

If desired, one or more grooves may be formed in the mold body to receive the fluid permeable conduit. Such grooves promote maximum contact between the conduit means and the mold body. The grooves are, however, not essential. Satisfactory results generally may be obtained by merely placing the fluid conduit in contact with the ungrooved outer surface of the mold body.

The fluid conduit means is then sealed by covering it with a sealing composition. Practically any fluid-impermeable adhesive resinous material may be used. The viscosity of the sealing composition should be sufficiently high that the sealer will not flow between the fluid permeable conduit and the mold body. The sealing composition should at least cover the entire length of the fluid-permeable conduit which is in contact with the mold body. One composition which has been found to be particularly useful for this purpose is an aluminum-filled epoxy resin tooling paste manufactured by Ren Plastics of Lansing, Michigan, and sold under the trademark RP1250.

It is also desirable to seal all of the exposed surfaces of the mold body except for the mold face so that fluid entering the mold body from the permeable conduit is constrained to exit through the mold face. Accordingly, the sealing composition which is used to seal the fluid permeable conduit to the mold body may be spread over the entire outer surface of the mold body excepting the mold face. Alternatively, a second sealing composition may be used to seal the exposed surfaces of the mold body. It has been found that a silicon carbide filled epoxy laminating resin manufactured by Ren Plastics of Lansing, Michigan, and sold under the trademark RP3270 is particularly satisfactory for this purpose. The mold is then placed in a suitable casing metal or other material and backed with an epoxy, sand and gravel mixture or with gypsum plaster.

A preferred composition for the epoxy, sand and gravel backing material is disclosed in detail hereinafter. If plaster is used, it may be necessary in order to promote bonding to interpose some material between the plaster backing material and the resin coated mold body to which they both adhere, such as a thixotropic epoxy resin laminating gel. A suitable laminating gel is sold by Ren Platics of Lansing, Michigan, under the trademark RP1117. The mold bodies are then ready for use in the established manner in a high speed press molding operation for forming ceramic ware.

BRIEF DESCRIPTION OF THE DRAWINGS

FIG. 1 is a sectional view of a porous, fluid-release press mold constructed according to the invention; and FIG. 2 is a plan view, partially in section, of a porous mold body used in the molds of the invention showing fluid-permeable conduit means sealed in grooves on the back thereof.

DESCRIPTION OF THE PREFERRED EMBODIMENT

FIG. 1 shows a press mold generally designated by reference numeral 1 which comprises an upper male member 2 and a lower female number 3. The porous alumina, ball clay and talc mold body of the male mold member 2 is designated by reference numeral 4. The porous alumina, ball clay and talc mold body of female mold member 3 is designated by reference numeral 5. The adjacent faces of mold bodies 4 and 5 are formed as mold faces 6 and 7 on the male and female mold bodies, respectively. Wet plastic clay, designated by reference numeral 20, is shaped to produce a desired shaped clay article, in this case a square plate, by pressing it between the mold faces 6 and 7 of the mold bodies 4 and 5. The back of male body 4, opposite mold face 6, is designated by reference numeral 8. Similarly, the back surface of female mold body 5, opposite mold face 7, is designated by reference numeral 9. The back surfaces 8 and 9 of the porous mold bodies are provided with a series of grooves designated by reference numeral 10. Grooves 10 receive a fluid permeable conduit means designated by reference numeral 11, comprising a loosely woven cotton fiber fabric tube. The grooves may be arranged in a generally concentric relationship, as shown more clearly in FIG. 2 or, they may be arranged in a spiral relationship or in alternating S-curves back and forth across the back surface of the mold body or in some other relationship. The only requirement is that the fluid permeable conduit be arranged so that fluid is conveyed through the mold body to substantially the entire mold face. In practice it may be found desirable to adjust the spacing of the conduit members so that the lie closer together adjacent portions of the mold face where release of the formed clay article from the mold is particularly critical, thereby providing for a slightly increased flow of fluid through such portions. Such a modification is considered within the scope of the invention.

It is likewise within the scope of the invention to eliminate the grooves entirely, and merely place the fluid permeable conduit members firmly in contact with the ungrooved back surfaces of the porous mold bodies. Arrangement of the fluid permeable conduits along the sides of the mold bodies in addition to or instead of along the back surfaces thereof may be desirable in some instances and is also considered to be within the scope of the invention.

The fluid permeable conduits 11 are sealed to the porous mold bodies 4 and 5 sealing means designated by reference numeral 12. The sealing means preferably takes the form of a fluid impermeable resinous material. In the preferred embodiment, the sealing means comprises an aluminum filled epoxy resin tooling paste. The paste is applied to the back surfaces of the mold bodies over the fluid permeable conduits thus preventing escape of air from the fluid permeable conduits other than into the porous mold body. The sealer should be of sufficiently high viscosity that it will now flow down into the grooves between the fluid permeable conduits and the porous mold body.

The back surfaces of the porous mold bodies are then also sealed with a sealing material. This is to prevent the fluid from leaving the mold body except through the mold face. Obviously, such sealing may be effected by applying the composition used to seal the fluid permeable conduits to the mold body, over the back and side surfaces of the mold body. Alternatively, a second sealing material, preferably also a fluid impermeable resin, may be applied over the first sealing material and over the exposed back and side surfaces of each of the mold bodies. Such a precedure is illustrated in the figures, wherein reference numeral 13 designates a coating of silicon carbide filled epoxy laminating resin which in the preferred embodiment is applied over the expoxy tooling paste and over the exposed surfaces of the mold bodies to prevent egress of fluid therethrough. Thus, fluid which enters the porous mold bodies 4 and 5 from the fluid permeable conduits 11 is constrained to exit the said bodies through the mold faces 6 and 7 thereby effecting release of the shaped clay articles from the mold surfaces.

Mold bodies 4 and 5 with the attached fluid permeable conduit means and sealing material are mounted in appropriate casings 16 and 17 respectively. The casings are normally formed of cast iron or steel, but any other material of suitable strength and rigidity could of course be substituted therefor. The spaces between the mold bodies and the casing members are filled with a backing material to provide adequate support for the mold bodies. The backing material is designated in FIG. 1 by reference numeral 15 and preferably comprises a mixture of epoxy, sand and gravel formed by mixing together 9 pounds of a low-shrinkage epoxy adhesive resin, approximately forty-four pounds of fine pea gravel and approximately sixteen pounds of sand. A suitable low-shrinkage adhesive resin is manufactured by Ren Plastics of Lansing Michigan, and sold under the trademark RP1700. While the resin, sand and gravel mixture is curing, fine gravel is sprinkled over the back. This gravel forms an irregular surface which serves to anchor a plaster cap 14 about 1 inch thick which is poured over the back of the backing material in order to provide a smooth rear surface for the assembled unit. Alternatively, the back of the epoxy, sand and gravel mixture can be machined flat to provide a smooth surface. Gypsum plaster may also be used as the backing material. The mold bodies are secured in their casings by means of steel pins 24 which extend from sockets in the mold bodies in the backing material.

Should the sealing composition used to seal the back and side surfaces of the porous mold body and the backing material used to fill the space between the mold body and the associated casing not adhere well to each other, it is desirable to further coat the back and side surfaces of the mold body with a bonding material which will ensure that the mold body is firmly secured to the backing material in the casing. For example, if gypsum plaster is used as the backing material, each of the mold bodies may be coated with a thin layer of thixlotropic epoxy surface coating gel to which both the silicon carbide laminating resin and the gypsum plaster adhere.

In operation of the mold, a body of moist plastic clay, designated by reference numeral 20, is placed between the mold surfaces 6 and 7 and the male and female mold members 2 and 3, are brought together until the clay is pressed between them to the desired shape. A slight excess of clay is used, and the excess is forced out from between the mold faces 6 and 7 into the gutters designated by reference numeral 18 during the pressing operation. When the mold members 2 and 3 are completely closed, the excess clay in gutters 18 is trimmed from the shaped clay article by cutting points 19 formed around the edges of the mold faces and compressed air is then introduced through the fluid-permeable conduit in one of the mold bodies, usually the lower of the two, as the mold is opened. This causes the shaped clay article to be released from the lower mold body, while it continues to adhere to the mold face of the upper body. The upper mold is then transferred to a depositing station where compressed air is introduced through the fluid-permeable conduit means affixed to the upper mold body, whereby release of the shaped clay article from such body is effected. The cycle is thereafter repeated with a further mass of wet plastic clay. While, as depicted in the drawings, in the disclosed embodiment the male member is the upper member, the positions of the male and female members may be reversed without departing from the scope of invention.

FIG. 2 is a plan view of the back of mold body 4, partially in section showing more clearly the arrangement of the fluid permeable conduit and the sealing compositions thereon. As noted hereinabove, the grooves 10 on mold body 4 are arranged in generally concentric relationship, but as previously stated the groove may be disposed in any arrangement which effectively spreads the fluid flow over the substantially the entire surface of the mold face, or the grooves may be dispensed without entirely. A fluid permeable woven cotton tube 11 is disposed in grooves 10. Compressed air is introduced into one end 22 of the tube 11. The other end 23 of the tube 11 is sealed so that the air is constrained to diffuse the through the wall of the tube into the porous mold body 4 along substantially the entire length of tube which is in contact with the mold body. Escape of air through the portion of the tube which precedes the point at which the tube comes in contact with the mold body is prevented by sealing such portion with the epoxy resin tooling paste used to seal the tube to the mold body. Alternatively, such portion may be wrapped with a fluid-impermeable tape or may be lined by inserting a smaller fluid-impervious, flexible tube therein. The epoxy resin tooling paste 12 sealing the permeable tube 11 to the mold body 4 is shown partially cut away in FIG. 2 to show portions of the tube. Similarly, the epoxy laminating resin 13 used to seal the exposed portions of the back surface 8 of mold body 4 is shown partially cut away to show the underlying sealing material and fluid permeable tube.

After the problem of decrease in permeability due to accumulation of residues from the combustible tubing was solved by mounting the conduit member on the back of the mold body, it became possible to obtain more than 3000 or so pressing from a mold. Upon continued use of the molds, the fluid permeability was found to decrease after approximately 5000 pressings to that between five and ten thousand pressings the molds became unusable. Inspection of the mold faces revealed that the surface of the ceramic, which normally is light tan in color, had turned dark brown. The source of this problem was determined to be the accumulation of colloidial material from the clay on the mold body surface. When the surface accumulation was removed by sanding the mold face carefully with fine sandpaper, the fluid permeability of the mold bodies was fully restored, and the molds were again useable. After an additional five to ten thousand pressings, the dirty brown accumulation reappeared and had to be removed again in the same manner. Applicants' preferred manner of removing the accumulation is to sandblast the mold face. Experience has demonstrated that the mechanical abrasion of the mold face to remove the colloid accumulation may be repeated up to from 6 to 10 times without destroying the mold designs or exceeding dimensional tolerances of the molds. Thus, it is now possible to obtain up to 50,000 or more pressings from a single mold set. One test mold has been successfully used for over 67,000 pressings without permanent loss of porosity. It can therefore be seen that the instant invention makes possible a more rapid and economical production of press-molded ware.

What is claimed is:

1. A method of manufacturing a fluid-release mold comprising the steps of:

providing a preformed, porous mold body made from an alumina containing ceramic material fired to a point short of the theoretical density for said material; said preformed mold body having a mold face formed on a first exterior surface therof;

disposing a flexible, tubular, fluid-permeable conduit externally on a second exterior surface of said preformed mold body such that the externally disposed conduit has a first wall portion contiguous with said second exterior surface and a non-contiguous second wall portion free of contact with said preformed mold body; said contiguous first wall portion of the fluid-permeable conduit being in fluid communication substantially continuously along the entire length thereof with said second exterior surface of the preformed mold body, whereby fluid from said flexible conduit may pass therefrom into the porous mold body, and covering said non-contiguous second wall portion of the fluid-permeable conduit and sealing the conduit to the mold body with a fluid-impermeable, adhesive, resinous material whereby the conduit is secured to the mold body and egress of fluid from said conduit is prevented except through the mold body.

2. A method of manufacturing a fluid-release mold as recited in claim 1 wherein said ceramic mold body comprises at least 70% alumina, up to 15% ball clay and up to 15% talc by weight.

3. A method of manufacturing a fluid-release mold as recited in claim 2 further comprising the step of mounting the mold body in a metal casing with free space surrounding said mold body in said casing and filling said free space between said mold body and said casing with a backing material which supports the mold body in the casing.

4. A method of manufacturing a fluid-release mold as recited in claim 3 wherein said backing material comprises a mixture of sand and fine gravel bonded together by an epoxy resin.

5. A method of manufacturing a fluid-release mold as recited in claim 4 further comprising the step of forming a gypsum plaster cap over the back of the resin bonded sand and gravel.

6. A method of manufacturing a fluid-release mold as recited in claim 2 wherein said ceramic material further comprises up to 5% by weight manganese dioxide flux.

7. A method of manufacturing a fluid-release mold as recited in claim 2 wherein said resinous material comprises an epoxy resin paste.

8. A method of manufacturing a fluid-release mold as recited in claim 7 wherein said epoxy resin paste is an aluminum filled epoxy resin tooling paste.

9. A method of manufacturing a fluid-release mold as recited in claim 2 further comprising the additional step of coating the surfaces of said mold body except for said mold face with a fluid-impermeable resinous material, whereby fluid entering the mold body from the fluid permeable conduit is constrained to exit from the mold body through the mold face.

10. A method of manufacturing a fluid-release mold as recited in claim 9 wherein said fluid impermeable resinous material is an epoxy resin.

11. A method of manufacturing a fluid-release mold as recited in claim 10 wherein said epoxy resin is a silicon carbide filled epoxy casting resin.

12. A method of manufacturing a fluid-release mold as recited in claim 2 wherein said fluid-permeable conduit comprises a tube of woven fabric material.

13. A method of manufacturing a fluid-release mold as recited in claim 2 wherein said fluid-permeable conduit is received in grooves formed on said second exterior mold body surface.

14. A method of manufacturing a fluid-release mold as recited in claim 2 wherein portions of said fluid-permeable conduit are disposed on said second mold body exterior surface in closer spatial arrangement adjacent portions of the mold face where release of formed articles from the mold is critical, whereby a greater proportion of the fluid which passes through the mold body will be directed to said mold face portions.

15. A fluid-release mold comprising:

a preformed, porous mold body, made from an alumina containing ceramic material fired to a point short of the theoretical density for said material; said preformed mold body having a mold face formed on a first exterior surface thereof;

a flexible, tubular, fluid-permeable conduit externally disposed on a second exterior surface of said preformed mold body; said externally disposed conduit having a first wall portion contiguous with said second exterior surface of said preformed mold body and a non-contiguous second wall portion free of contact with said preformed mold body; said contiguous first wall portion being in fluid communication substantially continuously along the entire length thereof with said second exterior surface of said preformed mold body, whereby fluid from said fluid-permeable conduit may pass therefrom into the preformed, porous mold body, and a fluid-impermeable, adhesive, resinous material covering the non-contiguous second wall portion of said fluid-permeable conduit and sealing the conduit to the mold body, whereby the conduit is secured to the mold body and egress of fluid from said conduit is prevented except through the mold body.

16. A fluid-release mold as recited in claim 15 wherein said ceramic mold body comprises at least 70% alumina, up to 15% ball clay and up to 15% talc by weight.

17. A fluid-release mold as recited in claim 16 further comprising a metal casing surrounding said mold body and a backing material supporting said mold body in said casing.

18. A fluid-release mold as recited in claim 17 wherein said backing material comprises a mixture of sand and fine gravel bonded together by an epoxy resin.

19. A fluid-release mold as recited in claim 18 further comprising a gypsum plaster cap over the back of the resin bonded sand and gravel.

20. A fluid-release mold as recited in claim 16 wherein said ceramic material further comprises up to 5% by weight manganese dioxide flux.

21. A fluid-release mold as recited in claim 16, wherein said sealing means comprises an epoxy resin paste.

22. A fluid-release mold as recited in claim 21, wherein said sealing means comprises an aluminum filled epoxy resin tooling paste.

23. A fluid-release mold as recited in claim 16, wherein the surfaces of said mold body except for said mold face are coated with a fluid impermeable resinous material, whereby fluid entering the mold body from said fluid conducting means is constrained to exit from the mold body through the mold face.

24. A fluid-release mold as recited in claim 23, wherein said fluid impermeable resinous material is an epoxy resin.

25. A fluid-release mold as recited in claim 24, wherein said fluid impermeable resinous material is a silicon carbide filled epoxy casting resin.

26. A fluid-release mold as recited in claim 16, wherein said fluid conducting means comprises a tube of woven fabric material.

27. A fluid-release mold as recited in claim 16, wherein said fluid conducting means is received in grooves formed on said second mold body.

28. A fluid-release mold as recited in claim 16, wherein adjacent portions of said fluid permeable conduit means are disposed on said second mold body surface in a closer spatial arrangement adjacent portions of the mold face where release of formed articles from the mold is critical, whereby a greater proportion of the fluid which passes through the mold body is directed to said portions.

* * * * *